Dec. 30, 1952     P. E. LUTHER     2,623,562
FRUIT PITTING MACHINE
Filed July 9, 1949     2 SHEETS—SHEET 1
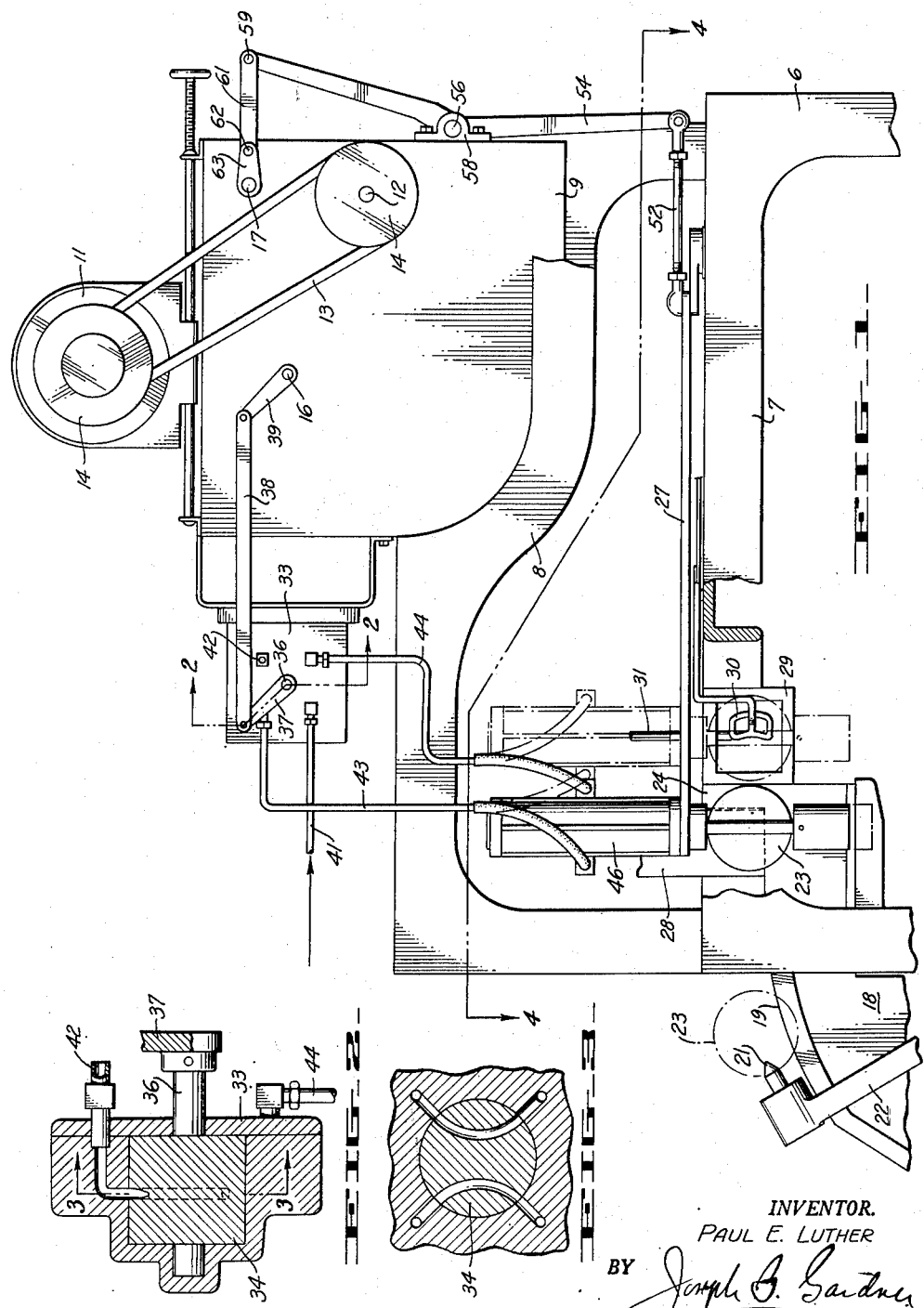
INVENTOR.
PAUL E. LUTHER Dec. 30, 1952      P. E. LUTHER      2,623,562
FRUIT PITTING MACHINE
Filed July 9, 1949      2 SHEETS—SHEET 2
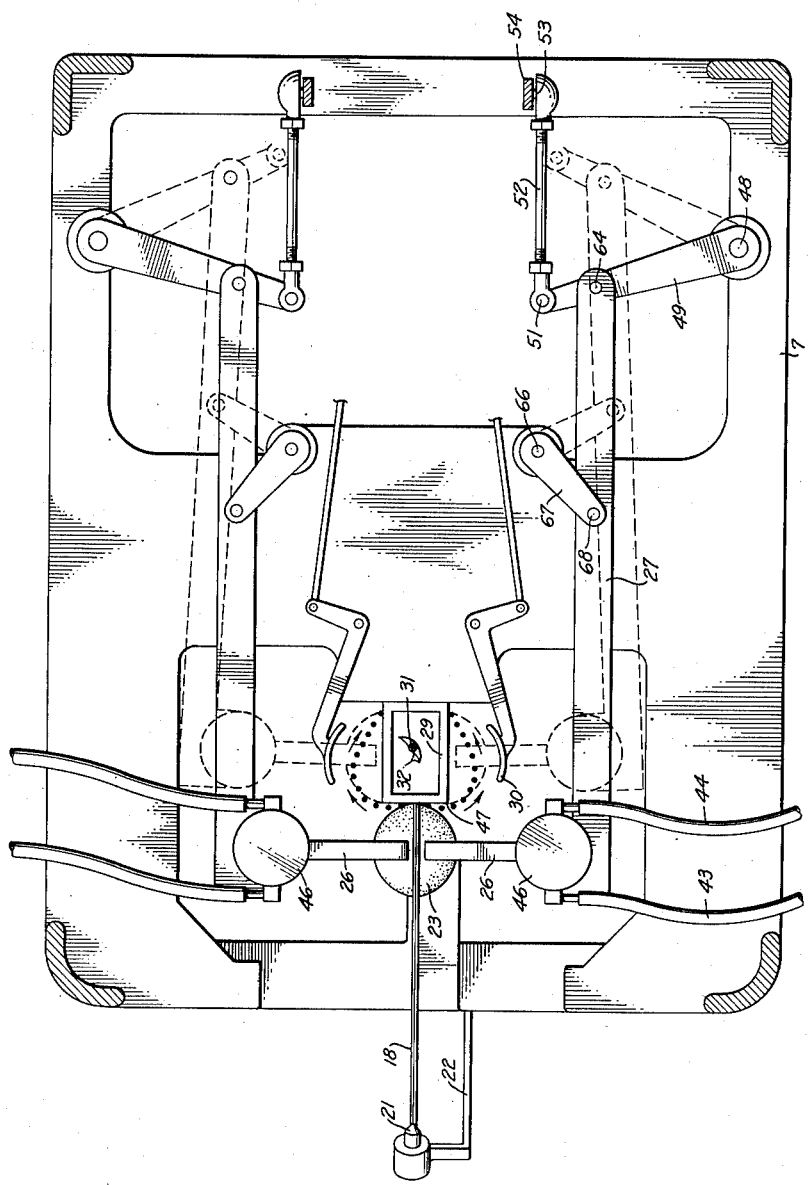
INVENTOR.
PAUL E. LUTHER
BY Joseph B. Gardner
atty Patented Dec. 30, 1952

2,623,562

UNITED STATES PATENT OFFICE 2,623,562

FRUIT PITTING MACHINE

Paul E. Luther, Oakland, Calif., assignor of fifty-two one-hundredths to F. M. Ball & Co., Oakland, Calif., a corporation of Nevada Application July 9, 1949, Serial No. 103,775

4 Claims. (Cl. 146—28)

This invention relates to machines for removing cling pit sections from bisected fruit such as peaches, and has particular reference to the construction and operation of the mechanism for effecting shifting of successive fruit halves between the bisecting unit of the apparatus and the unit which performs the operation of pit removal.

An object of the invention is to provide improved mechanism for transporting separated fruit sections, between bisecting and pitting units of a machine of the class described, which will function efficiently regardless of considerable variations in sizes of fruit being handled.

Another object of the invention is to provide improved fruit section transport mechanism which is capable of causing the fruit sections to be carried into operative proximity with the pitting mechanism so as to cause no damage to the fruit sections during the process of transportation, as may occur in the present machines.

A further object of the invention is to provide improved mechanism for effecting positive shifting with a minimum of backlash, of sections of bisected fruit between a separating position in which the fruit sections are in relative axial contiguity to a pitting position wherein the fruit sections are in relatively axially spaced positions transaxially displaced from their separating position.

Still another object of the invention is to provide improved mechanism for effecting the aforesaid movements of the fruit sections in a smooth and very rapid manner but without imposing undue strain or creating excessive wear in the motivating apparatus for driving the mechanism.

It is another object of the invention to provide improved means for transporting an object along a travel path between parallel first and second planes and around an obstruction disposed at the intersection of a face plane with said second plane, in which the initial portion of the path is at least substantially parallel with the face plane and which thereafter follows a curving line to intersect the second plane.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a side elevational view of a pitting machine of the so-called "guillotine" type and including the improved movement linkage of my invention. Portions of the machine are broken away so as to shorten the view and also to more clearly disclose details of internal construction.

Figure 2 is a vertical sectional view of the gripper control valve, the plane of section being indicated by the line 2—2 of Figure 1.

Figure 3 is a vertical sectional view taken in the plane indicated by the line 3—3 of Figure 2.

Figure 4 is a horizontal sectional view taken in the plane indicated by the line 4—4 of Figure 1.

One of the most successful machines for the removal of adherent pits from fruit, particularly cling peaches, is the so-called "guillotine" type wherein a whole fruit, confined in relatively confronting axially aligned clamping grippers, is caused to pass between edgewise vertically aligned and comparatively thin knives which not only ring the fruit flesh with a peripherally extending cut intersecting the axis of the pit but also cause cleavage of the pit upon deliverance of a sharp blow to one or both of the knives to cause them to relatively approach each other and to penetrate the pit sufficiently to effect a comparatively clean pit breakage. Subsequently, the now separated fruit halves with their adhering pit sections are moved axially apart and are transaxially advanced into the possession of secondary grippers which hold the fruit halves overlying the opposite open sides of a housing in which is operable a spoon cutter having a segmental spheroidal contour which approaches the cut plane of each fruit half and scoops therefrom the embedded pit section, the secondary grippers then moving relatively apart, depositing their pitted fruit sections while the first-mentioned grippers are returning toward the guillotine knives to engage a succeeding whole fruit and carry the relatively created halves thereof through the previously outlined cycle of operations.

Essentially, and as best shown in Figure 1, such a machine comprises a supporting base 6 having a table top 7 surmounted by a frame 8 carrying at its rearward end a transmission gear box containing suitable gearing for imparting rotative effort or other movement to various operational elements of the machine from an electric motor 11 carried by the gear box and connected to drive the power input shaft 12 thereof through a suitable belt 13 and pulleys 14, the latter being connected, respectively, with the shaft 12 and with the shaft of the motor. It is unnecessary to describe here or show in the drawings any of the internal details of the gear box other than to indicate the pair of power output shafts 16 and 17, which is essential to the description and performance of the improved movement linkage of my invention, and to state that the former shaft is capable of timed oscillatory movement with a predetermined period of stoppage between opposite reciprocatory movements, while the latter shaft is capable of continuous unidirectional rotation.

The forward portion of the table 6 of conventional machines is fitted with an edgewise vertical fixed guillotine knife 18 the upper edge 19 of which is curvate and sharpened and along and above which may move the pointed stud 21 of a movable pusher arm 22 which is suitably driven to oscillate back and forth along the curved length of the guillotine knife 18. The peach 23 to be pitted, with the externally visible cleft of the latter uppermost, which also represents the parting plane of the pit halves, is placed on the lower guillotine knife 18, resting against the pointed end of the pusher arm stud 21. While so positioned, the fruit is rolled upwardly along the guillotine knife 18, by and upon movement upwardly of the pusher arm 22, until the fruit pit comes to rest against a perpendicular extension 24 of the latter knife and the forward bisected portion of the fleshy envelope of the fruit straddles the latter extension. At this point, a pair of relatively confronting gripper jaws 26 carried by and at the distal ends of oppositely movable arms 27, approach the sides of the lower guillotine knife and straddle the opposite sections of the fruit, pressure being simultaneously applied to the gripper jaws in a manner to be hereinafter described to forcibly clamp the fruit sections therebetween. During an interval of dwell of the gripper jaws 26 in proximity to the lower guillotine knife 18, an edgewise vertical upper guillotine knife 28, suitably mounted for movement perpendicularly of the table 7 and registered with and capable of entering the cut of the fruit, is caused to descend into engagement with the fruit pit to register the latter vertically with the knives. Thereafter a blow is mechanically imparted to the knives with such impact force that the pit will be cracked apart along the two hemispherical sections of the fruit. The now separate fruit sections, each containing a pit half and while being maintained in possession of the gripper jaws 26, are caused to move in response to movement of the arms 27, relatively apart and rearwardly of the table 7 to come to rest with their cut faces pressed against the opposite open sides of a hollow pitter housing 29, whereupon clamping grippers 30 swing inwardly between each pair of gripper jaws to clamp the fruit halves against the sides of the housing, the gripper jaws then releasing to return and engage a peripherally cut whole fruit which has been moved into position by the pusher arm 22. The actuating mechanism and timing for such clamping gripprs is well known in the art and no detailed explanation is therefore believed necessary for an understanding of the present inventiin. In the housing 29 is operable, by means of a suitably supported and motivated gyratory shaft 31, a spherically segmental pitter knife 32 which alternately approaches the held fruit sections and, while rotating, scoops the pit halves therefrom, the latter then falling through the open bottom of the housing 29 into a suitable disposal chute or other receiver. Control of air pressure for actuation of the grippers 20 is effected by a flow selector valve 33 whose rotor 34 carries a shaft 36 having a lever 37 connected thereto, the distal end of which is pivotally attached to a link 38 similarly connected to a lever 39 carried by and responsive to movements of the gear box shaft 16. Separate pressure and exhaust lines 41 and 42 respectively enter the valve 33 and separate feed lines 43 and 44 lead from the valve to the input and exhaust ducts of actuating cylinders 46 carried by the respective arms 27 and arranged to move the gripper jaws 26 in opposite directions vertically of the path of travel of the arms and independently of the swinging operative movement of the latter.

Immediately after the pitting cutter 32 has completed its cycle of operation to detach the imbedded pit halves from the fruit sections, the clamping grippers 30 will be moved relatively apart, such relative spreading of the grippers being sufficient to allow the pitted fruit sections to be discharged between the grippers and the pitting housing and to fall downwardly along the sides of the pitter housing into a suitable receiver or takeaway conveyor positioned below the table 7. During the preceding forward movement of the gripper jaws 26 with their carrier arms 27 the former, due to a following cycling of the selector valve 33 will return to normal spaced apart relation as a result of exhausting of the cylinders 46. Thus when the gripper jaws reach their forward and relatively approaching limit of travel in response to movement of the arms 27, a succeeding peripherally cut fruit will have been positioned by the pusher arm 22 at the upper end of the curvate lower guillotine knife with the result that the gripper jaws will straddle the opposite fruit sections, the air valve will be cycled to cause the jaws to engage the fruit, the guillotine knives will cooperate to split the fruit pit and the foregoing sequence of operations will be repeated.

In the type of pitting machine thus far described, it is highly desirable, in order to advance production capacity to the maximum, to cause transfer of the separated fruit sections from the initial gripping position at the guillotine knives to the ultimate release position at the pitter housing along a path of positional displacement designed to lessen strain on the motivating mechanism and eliminating damage to the fruit sections during transportation thereof. This path of most desirable form is indicated by the direction arrows and dotted path of Figure 4 and shows that the gripper jaws 26, which are initially positioned at the start of their operational cycle as closely as possible, in consideration of the size of the largest fruit expected to be encountered in the course of operations, to the forward side of the pitter housing 29. The first movement of the gripper jaws carrying the relatively separated fruit sections should be substantially linearly apart, without any marked degree of rearward movement toward the pitter housing, at least until the plane of cut of the fruit sections comes into registry with the opposite sides of the pitter housing whereupon the gripper jaws should be substantially immediately started rearwardly to deposit the fruit sections on the pitter housing sides in proper positions to be engaged by the clamping grippers 30 and the pitting cutter 32. In existing machines, the presently utilized arm actuating mechanism, which comprises for each arm an oscillating member provided with a substantially spiral cam groove engaging a follower roller or block carried by the arm, is incapable of producing a travel action for the gripper jaws along the desirable path indicated due in part to the development of excessive side pressures in the cam and in its motivating shaft 17 and also because of the creation in the cam action of equally excessive backlash which would seriously interfere with proper timing and movements of the gripper jaws. Consequently, in order to provide adequately smooth operation, it has been necessary in existing machines to place the point of initial engagement of the gripper jaws with the fruit sections a considerable distance forward of the pitter housing, the subsequent movement of the gripper jaws from this initial position being along outwardly and materially rearwardly curving paths to the point of deposit of the fruit sections against the sides of the pitter housing as compared with the more desirable sharply veering course after completion of the initial comparatively linearly outward movement of the jaws. By placing the point of initial engagement of the gripper jaws with the fruit sections a considerable distance forward of the pitter housing, the linear spacing between the initial and final positions of the jaws will be increased, and as this added distance is doubled during each complete transport cycle, the ultimate production capacity of the pitting machine is substantially reduced.

Another undesirable feature inherent in the cam actuated operation of the gripper jaws of existing machines is the likelihood of misalignment of the fruit sections with the pitter housing and cutter due to the rapid wearing of the cam parts effected in part by the aforementioned excessive side pressures. Also the likelihood of fruit damage is attributable directly to the particular cycling movement imparted to the jaws. As long as fruit not exceeding a prescribed maximum diameter is encountered in a production run, the existing machines will function satisfactorily in respect to the actual transportation of the severed fruit from the guillotine knives to the pitting position. However, if some slightly oversized fruit is encountered, the perimeters of the fruit halves will not clear the outlying corners 47 of the pitter housing during the retroflexed transport movement with resulting injury to the fruit sections or the possibility that the latter will be struck such a blow as to cause possible dislodgement thereof from the gripper jaws or such displacement so as to misalign the fruit sections at the pitter box. In either case select or high grade fruit will be so mutilated that it must be relegated to a much lower grade classification. Since such a condition is possible in existing machines by the introduction thereinto of only slightly oversized fruits which, in the press of work, may easily escape the notice of the machine operator, it will be seen that the resulting mutilation and possible fouling of the machine with fruit fragments can seriously interfere with the attainment of maximum profitable production capacity.

I have provided improved mechanism for imparting cycling movement to the gripper jaws, which effects rapid movement of the latter between the guillotine and pitter positions with the least possibility of dislodging the fruit sections or otherwise inflicting damage thereon. As will be seen in Figure 4, I provide in the rearward portion of the table 7 a pair of laterally spaced and axially vertical studs 48, preferably, on which are journalled drive levers 49 extending inwardly of the table relatively toward each other and having, at their outer ends, pivot pins 51 connected with longitudinally adjustable links 52 similarly pivotally attached by pins 53 to the lower ends of arms 54. The latter arms, at points medially of their ends, are provided with pivot pins 56 carried by brackets 58 suitably fixed to the gear box 9, or other convenient portion of the machine structure, and at their upper ends are connected by pivot pins 59 with links 61 similarly connected by pivot pins 62 to the distal ends of levers 63 secured to and rotatable with opposite ends of the shaft 17. It will be thus seen that, upon rotation of the shaft 17, the arm 54 will be cyclically rocked and the levers 49 will be correspondingly reciprocated. Each of the arms 27 is pivotally connected, by means of a pivot pin 64, with a lever 49 at a point longitudinally of the latter between the stud 48 and the pivot pin 51 thereof. Journaled on studs 66 secured to and rising perpendicularly from the table 7, at points forwardly of the studs 48, is a pair of relatively outwardly and oppositely directed guide levers 67 which are pivotally connected, by means of pivot pins 68 to the arms 27 at points intermediate the ends of the latter. The guide levers 67 are much shorter than the drive levers 49 so that the pivot pins 68 will describe arcs of very pronounced curvature in comparison with the materially flatter curvature of the arc described by the pivot pins 64 of the drive levers. The normal positions of the arms, when the gripper jaws 26 are at the guillotine knives and in possession of fruit which is being or has been separated by the knives, is substantially as shown in Figure 4 wherein they are preferably parallel, longitudinally, with the vertical central plane of the machine. The arrangement of the levers 49 and 67, in relation to each other and to the arms 27 is such that, upon initiation of movement in the levers and arms in response to rotational movement of the shaft 17, the pivot pins 68 during the first portion of their movement along their sharply curved path will be caused to progress laterally outwardly away from the aforesaid central plane of the machine while the pivot pins 64 will be caused to move more nearly parallel to and slightly inwardly relative to said plane. The result of these movements is to cause the distal ends of the arms 27 at the gripper jaws 26 to swing rapidly relatively outwardly without appreciable movement rearwardly of the machine toward the face of the gripper housing until the cut plane of the fruit sections carried by the gripper jaws registers with or passes outwardly beyond the parallel side faces of the pitter housing. Thereafter, as the levers 39 and 67 swing farther rearwardly of the machine more and more longitudinal motion combined with an increasing inward movement will be imparted to the arms 27 resulting in the gripper jaws and their contained fruit sections being carried along unusual curvate paths into operative positions overlying the opposite sides of the pitter housing. A trace of the path followed by the edge of the peach half is shown by the arrowed line of Figure 4 wherein it will be seen that the peripheral portion of the jaw, which is proximally related to the adjacent forward face of the pitter housing, follows a line, which in the extent of the face between the guillotine knives and the outer corner 47 of the housing is at least substantially perpendicular to the side of the knives since the line may curve in only a trifling degree toward the housing face. Beyond this, however, as shown by the path indication, the path curves rapidly outwardly, rearwardly and then inwardly to terminate at the side of the pitter housing. Thus the fruit sections carried by the gripper jaws, and even oversized section which may be peripherally touching the forward face of the pitter housing, will be safely carried around to the sides of the housing without impinging against the corners 47 and being torn or possibly dislodged from the gripper jaws thereby.

The condition of prime importance in the structure of my invention is that wherein the separated fruit halves are caused to move from a possible initial position in perimetral engagement with the face of the pitter housing, at its junction normally with the guillotine blades, outwardly along said face either paralleling the latter or progressively moving through greater stages of separation therefrom at least until the cut plane of the fruit passes outwardly beyond the corner 47, the path then veering or curving to cross the face plane and proceeding to intersect the side planes of the pitter housing hereinbefore referred to as the delivery positions. It will be apparent to those skilled in the art that the levers 49 and 67, both as to the relative positions of their fulcrums, their relative lengths and their points of attachment with the arms 27 may be arranged in any of a large number of ways to secure a path of movement of the fruit section as indicated. The arrangement shown is that which is the best and most easily adapted to conventional pitting machines and is intended in no way to limit the scope of the invention.

It will be seen that the gripper jaws and their associated arms 27, by being supported and guided in their movements by the respective levers 49 and 67, are positively motivated in response to movements of their drive initiating shafts 17 with a minimum amount of backlash or other lost motion which might interfere with instantaneous response of the arms 27 to movements of the levers and also the proper cooperative functioning or timing of the guillotine knives or the pitting cutter. It will also be seen that the straightforward drive arrangement afforded by the lever actuation of the gripper arms 27 is marked by the absence of any elements tending to create undue side pressures on pivot pins or excessive radial pressures on the drive shaft thereby rendering the mechanism capable of functioning efficiently throughout a long service life before repairs or overhaul are necessary.

I claim:

1. In a fruit pitting machine including a housing, vertically extending coplanar blades for transaxially bisecting a whole pit-bearing fruit, pitting mechanism longitudinally spaced from said blades for removing pit portions from sections of said fruit including a pitter housing having planar portions defining delivery positions perpendicularly and parallelly offset relative to the plane of said blades, a pair of grippers disposed on each side of said blades, a pair of horizontally disposed and longitudinally extending arm members each having an end thereof connected to and movable with the respective grippers, separate elements pivoted at longitudinally and radially offset portions of said housing and engaged pivotally with said arm members at spaced points thereon for guiding said spaced points along separate paths of differing curvature during movement of the arm members to guide said grippers along an initial path of movement relatively apart and substantially normal to the plane of said blades to points at least intersecting the planes of said planar portions of the pitter housing and along a secondary continuing path curvilinearly convergent to and intersecting the planes of said planar portions of the pitter housing, one set of said elements being pivotally connected to said arm members at the ends remote from said grippers and the other set of said elements being pivotally connected to said arm members intermediate the ends thereof, said first mentioned set of elements having a greater length between the pivotal connections to the housing and arm members than said latter set of elements, and means operatively connected with and to move said arm members.

2. In a fruit pitting machine including a housing, coplanar blades for transaxially bisecting a whole pit-bearing fruit, pitting mechanism longitudinally spaced from said blades for removing pit portions from sections of said fruit including a pitter housing having planar portions defining delivery positions perpendicularly and parallelly offset relative to the plane of said blades, a pair of grippers disposed on each side of said blades for engaging and holding the respective bisected sections of fruit and transferring the same from said blades to said pitting mechanism, and means for sequentially opening and closing the respective grippers to selectively engage and release said fruit sections; longitudinally extending arm members each having an end thereof connected and movable with the respective grippers, separate elements pivoted at longitudinally and radially offset portions of said housing and disposed on opposite sides of said arm members and pivotally engaged with the latter at spaced points thereon for guiding said spaced points along separate oppositely curving paths during movement of the arm members to guide said grippers along an initial path of movement relatively apart and substantially normal to the plane of said blades to points at least intersecting the planes of said planar portions of the pitter housing and along a secondary continuing path curvilinearly convergent to and intersecting the planes of said planar portions of the pitter housing, and means operatively connected with said arm members for reciprocating said grippers between said blades and said pitter housing.

3. In a fruit pitting machine including coplanar blades for transaxially bisecting a whole pit-bearing fruit, pitting mechanism longitudinally spaced from said blades for removing pit portions from sections of said fruit including a pitter housing having planar portions defining delivery positions perpendicularly and parallelly offset relative to the plane of said blades, a pair of grippers disposed on each side of said blades for engaging and holding the respective bisected sections of fruit and transferring the same from said blades to said pitting mechanism, and means for sequentially opening and closing the respective grippers to selectively engage and release said fruit sections; longitudinally extending arm members substantially parallel to the longitudinal axes of said housing and transversely spaced from said pitter planar portions each having an end thereof connected to and movable with the respective grippers, separate levers of different radial lengths pivotally secured to longitudinally and radially spaced portions of said housing and engaged pivotally with said arm members at spaced points thereon remote from said grippers for guiding said spaced points along separate paths one of which has pronounced curvature relative to another during movement of the arm members to guide said grippers along an initial path of movement relatively apart and substantially normal to the plane of said blades to points at least intersecting the planes of said planar portions of the pitter housing and along a secondary continuing path curvilinearly convergent to and intersecting the planes of said planar portions of the pitter housing, and means operatively connected with and to reciprocate said arm members, the longer of said levers being connected with the respective arm members adjacent the distal ends of the latter and the shorter of said levers being connected with the respective arm members intermediate the ends thereof.

4. In a fruit pitting machine including coplanar blades for transaxially bisecting a whole pit-bearing fruit, pitting mechanism longitudinally spaced from said blades for removing pit portions from sections of said fruit including a pitter housing having planar portions defining delivery positions perpendicularly and parallelly offset relative to the plane of said blades, a pair of grippers disposed on each side of said blades for engaging and holding the respective bisected sections of fruit and transferring the same from said blades to said pitting mechanism, and means for sequentially opening and closing the respective grippers to selectively engage and release said fruit sections; longitudinally extending and generally parallel arm members each having an end thereof connected to and movable with said grippers, separate levers of different radial lengths pivotally attached to said housing and engaged pivotally with each arm member at an extremity thereof remote from the gripper thereof and at an intermediate point on the arm between the said extremity and gripper thereof, said lever connected with said extremity having the greater length and guiding a portion of said arm along a curved path extending generally longitudinally of the arm and said lever connected with said intermediate point of the arm guiding said latter point of the arm along a curved path extending generally laterally of the arm during movement of the arm members to guide said grippers along an initial path of movement relatively apart and substantially normal to the plane of said blades to points at least intersecting the planes of said planar portions of the pitter housing and along a secondary continuing path curvilinearly convergent to and intersecting the planes of said planar portions of the pitter housing, and means operatively connected with said lever connected to the extremities of said arm members for oscillating the lever so as to move said arm members.

PAUL E. LUTHER.

REFERENCES CITED

The following references are of record in the file of this patent:

UNITED STATES PATENTS

| Number | Name | Date |
|---|---|---|
| 1,915,447 | Robbins | June 27, 1933 |
| 1,937,905 | Nevills | Dec. 5, 1933 |